United States Patent [19]

Nonaka et al.

[11] 3,836,168
[45] Sept. 17, 1974

[54] PERSONAL SAFETY DEVICE FOR USE IN VEHICLES

[75] Inventors: Kohei Nonaka; Masaho Tanaka, both of Tokyo; Takeshi Maki, Kawasaki; Ikuo Harada, Tokyo; Masafumi Hamasaki, Nobeoka, all of Japan

[73] Assignee: Asaki Kasei Kogyo Kabushiki Kaisha, Osaka, Germany

[22] Filed: Nov. 23, 1971

[21] Appl. No.: 201,322

[30] Foreign Application Priority Data
Nov. 30, 1970 Japan.............................. 45-104913

[52] U.S. Cl...... 280/150 AB, 180/82 C, 280/150 B, 297/216, 297/390
[51] Int. Cl............................................ B60r 21/08
[58] Field of Search.... 280/150 AB, 150 B, 150 SB; 297/216, 384, 390; 180/82 C

[56] References Cited
UNITED STATES PATENTS

| | | | |
|---|---|---|---|
| 2,025,822 | 12/1935 | Pryor............................... | 280/150 B |
| 3,022,089 | 2/1962 | Botar.............................. | 280/150 SB |
| 3,411,602 | 11/1968 | Royce............................ | 280/150 SB |
| 3,588,142 | 6/1971 | Gorman......................... | 280/150 AB |
| 3,623,768 | 11/1971 | Capener......................... | 280/150 SB |
| 3,633,936 | 1/1972 | Huber............................. | 280/150 B |
| 3,643,971 | 2/1972 | Kushnick....................... | 280/150 AB |
| 3,650,542 | 3/1972 | Shimano et al................. | 280/150 B |
| 3,664,682 | 5/1972 | Wycech......................... | 280/150 AB |
| 3,675,942 | 7/1972 | Huber............................ | 280/150 AB |
| 3,682,498 | 8/1972 | Rutzki........................... | 280/150 SB |
| 3,695,629 | 10/1972 | Schlanger...................... | 280/150 B |
| 3,715,130 | 2/1973 | Harada et al.................. | 280/150 AB |

Primary Examiner—David Schonberg
Assistant Examiner—John P. Silverstrim
Attorney, Agent, or Firm—Stevens, Davis, Miller & Mosher

[57] ABSTRACT

The invention relates to a personal safety device for protecting an occupant of a vehicle in the event of an accident. The device includes confining means, e.g., a net or cloth for retaining the occupant in close proximity to his seat, the confining means being normally in a gathered or folded condition adjacent to the occupant's seat. Gas generating means, e.g., a cylinder of compressed gas or a combustible chemical, is provided for projecting the confining means in front of the occupant and the device embodies means for drawing and tightening the confining means around the occupant's body. Operation of the device takes place automatically on detection by sensing means in the vehicle of an acceleration exceeding a predetermined magnitude.

2 Claims, 11 Drawing Figures

PERSONAL SAFETY DEVICE FOR USE IN VEHICLES

BACKGROUND OF THE INVENTION

This invention relates to a personal safety device for protecting an occupant of a vehicle, e.g., an automobile against injuries which would otherwise be suffered because of the effects of violent changes in velocity of the vehicle as by collision.

When an automobile is involved in a traffic accident such as a collision, for example, there is a possibility that the occupant of the vehicle thrown forward by inertia due to sudden deceleration impinges violently upon the wind shield or some other part of the automobile interior, thereby sustaining injuries. In recent years, there have been suggested various protective measures against such accidents. For example, there has been developed a method wherein a folded bag is rapidly inflated to full capacity with gas generated by suitable means so as to hold back the occupant's body and absorb the forces acting on the occupant's body. Such a method of rapid inflation of a bag seeks to absorb the inertia of the occupant's body by resorting to the mere cushioning effect of an inflated bag. The effectiveness of this method hinges upon the position at which the bag is disposed with reference to the position of the occupant of the vehicle. In the case of a bag disposed in front of the occupant, for example, this method is effective only when the violent acceleration, caused for example by collision, is a negative acceleration occurring in the direction of the vehicle's travel. It hardly produces the desired effect when the vehicle sustains a lateral impact by another vehicle or if it tumbles and lands on its side. Thus, this method has the disadvantage that bags are required to be disposed each in all conceivable directions of violent acceleration.

It is a primary object of the present invention to provide a safety device which provides protection for an occupant of a vehicle in a collision or other accident whatever the direction or nature of the force arising from violent acceleration of the vehicle.

Other objects and advantages of the invention will be apparent from the following description.

SUMMARY OF THE INVENTION

According to the present invention there is provided a personal safety device for protecting an occupant of a vehicle in the event of an accident, said device comprising;

a. confining means adapted in use for confining an occupant in close proximity to a seat, said confining means being normally in a gathered or folded condition adjacent to said seat, b. gas generating means adapted in use to project the confining means in front of said occupant, c. tightening means for drawing and tightening the confining means around the occupant's body, and d. sensing means adapted to actuate said gas generating means on detecting an acceleration exceeding a predetermined magnitude.

In this specification the term "acceleration" is intended to include all changes in direction or speed of a vehicle caused by application of an external force. In addition the term "vehicle" should be understood to include all land, air and sea borne transportation means, e.g., automobiles, trains, aircraft and motor boats.

In one embodiment of the present invention, the confining means comprises at least one bag inflatable by the gas generating means and having a cord or strap member for tightening the confining means around the occupant's body. The bag may be tubular in shape and be arranged to expand diagonally across the occupant's chest and together with the cord or strap member constitute the confining means. Preferably however there are a pair of inflatable tubular bags which are each arranged on inflation to extend on either side of the occupant's body and each tubular bag having a cord or strap member attached thereto for tightening the confining means around the occupant's body. Normally the two inflatable bags would be connected by a net or cloth.

In a second embodiment the confining means is adapted to be projected in front of the occupant by a pair of projectiles each having a cord or strap member attached thereto for tightening the confining means around the occupant's body.

DETAILED DESCRIPTION OF THE DRAWINGS

The present invention will now be described with reference to the accompanying drawings in which.

Figure 1:
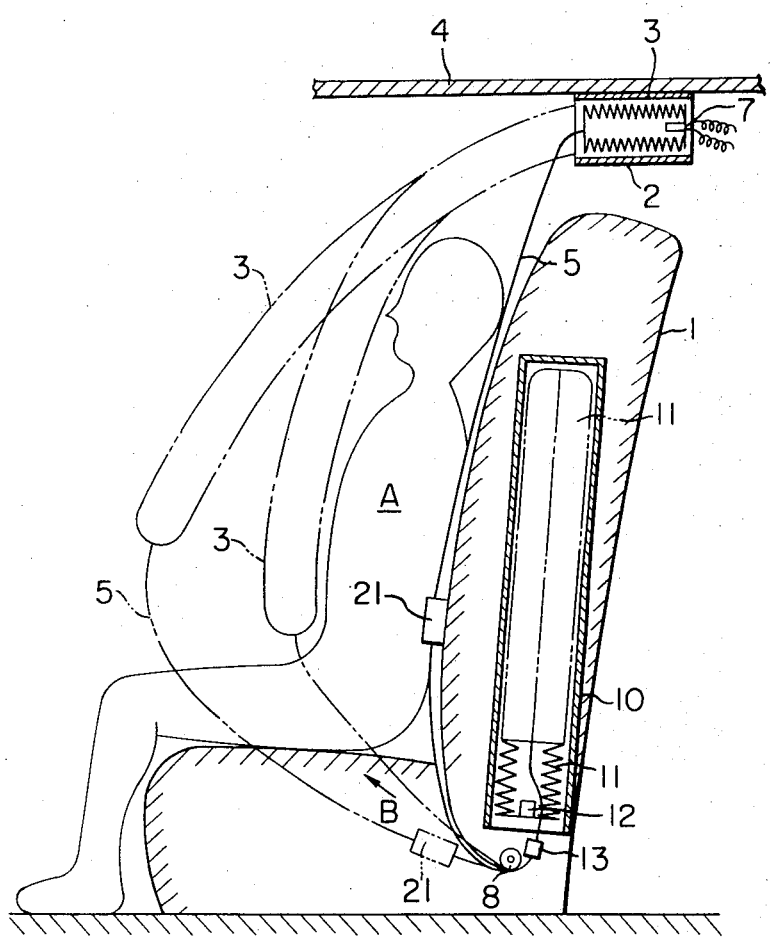
FIG. 1 is a sectional elevation of one embodiment of the personal safety device according to this invention.
Figure 2:
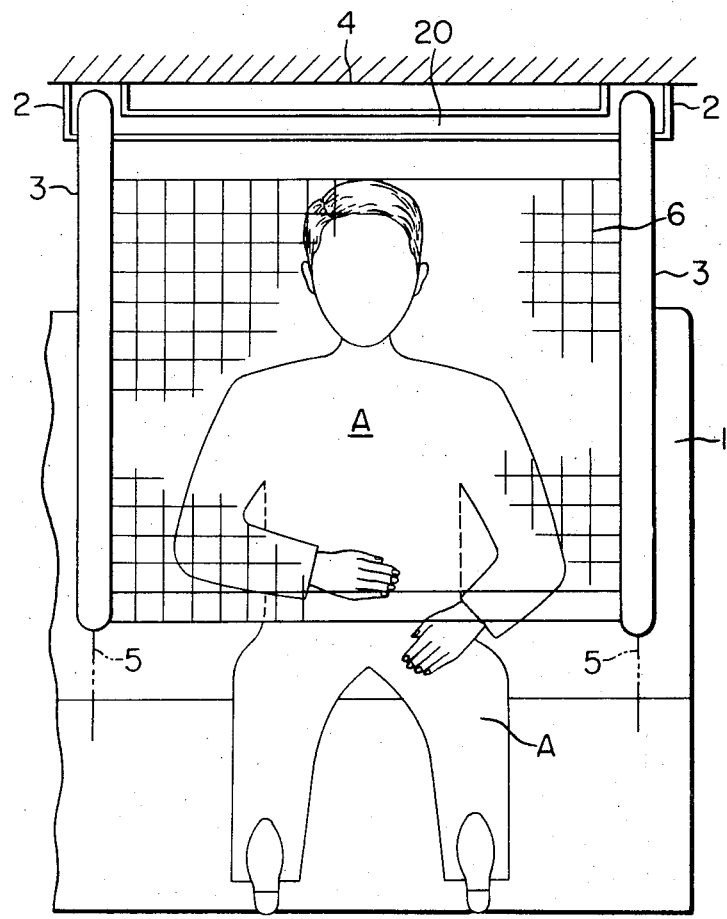
FIG. 2 is a frontal view of the device of FIG. 1 showing the device in its operative state.
Figure 3:
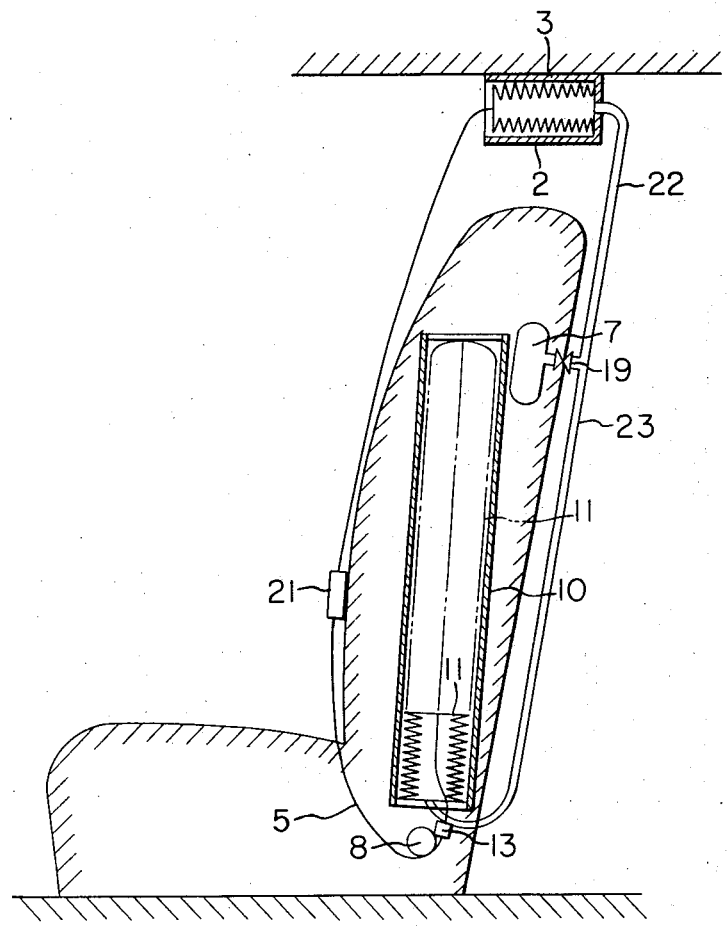
FIG. 3 is a sectional elevation of a modification of the device shown in FIG. 1.
Figure 5A:
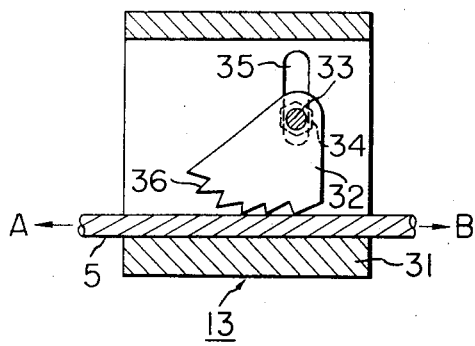
Figure 5B:
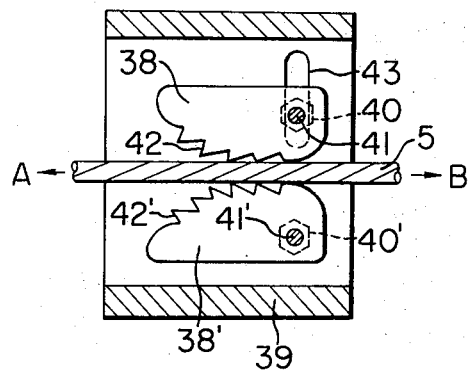
Figure 5C:
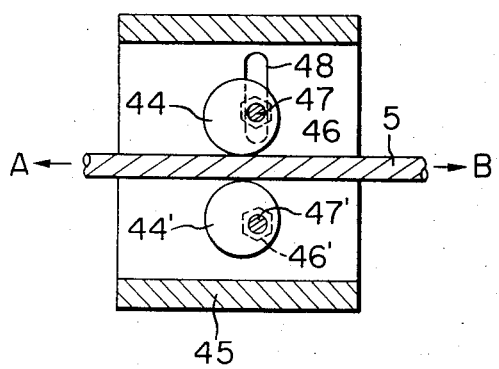
Figure 9:
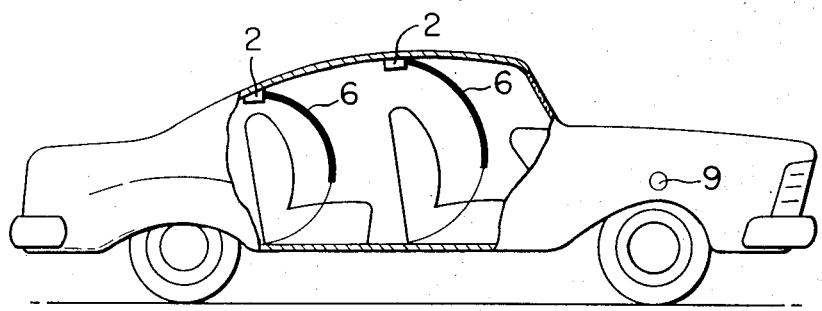
Figure 6:
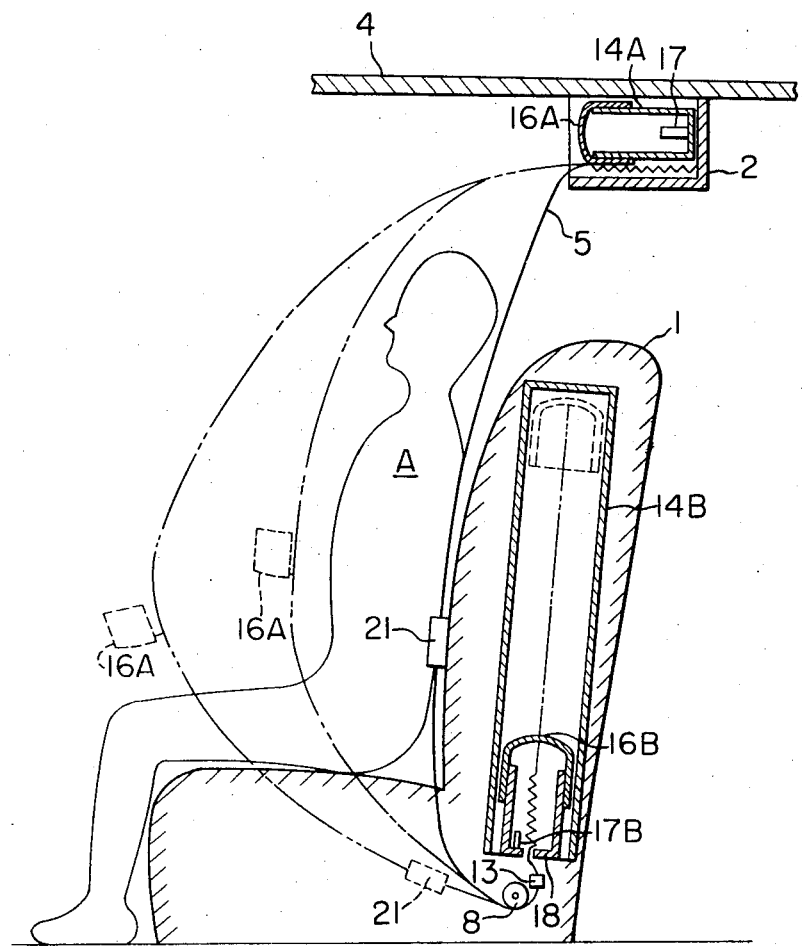
Figure 7:
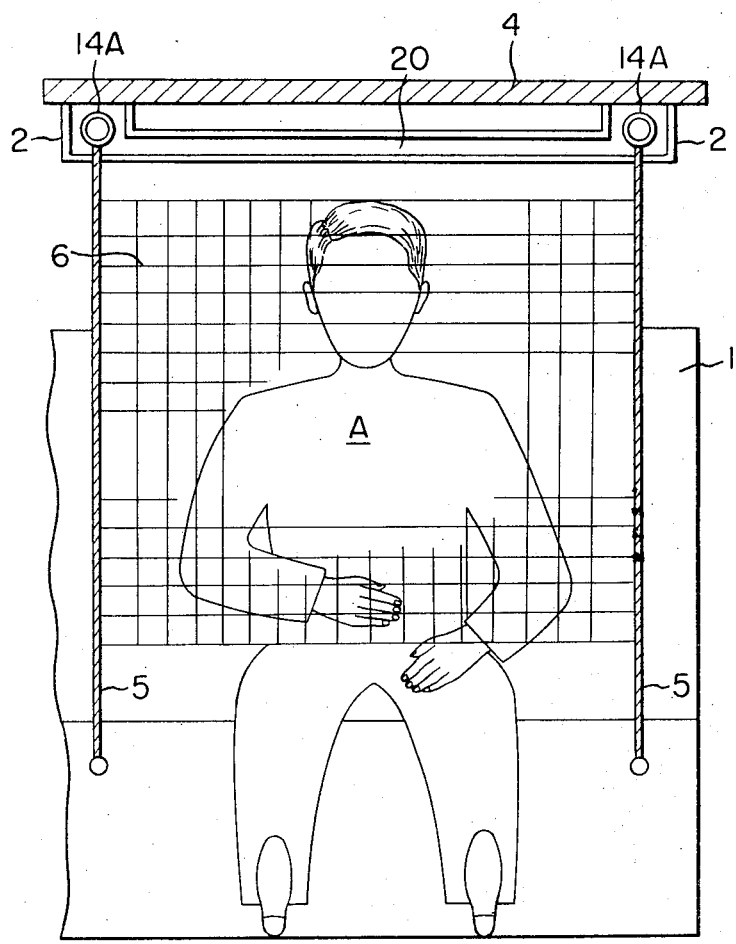
Figure 8:
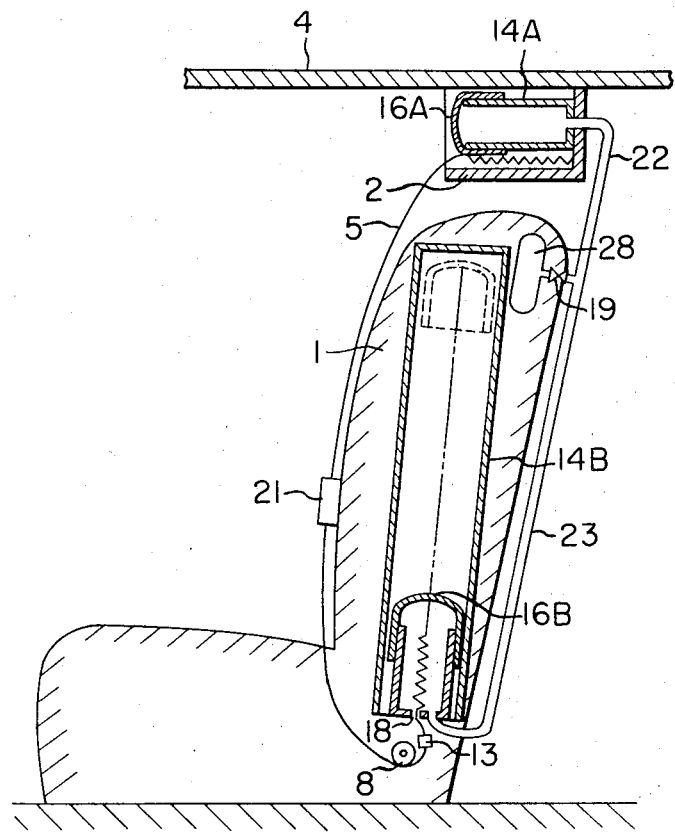

FIGS. 5a, 5b, and 5c are check stoppers, being parts of the devices shown in FIGS. 1 to 3;

FIG. 6 is a sectional elevation of another embodiment of the device according to this invention;

FIG. 7 is a frontal view of the device of FIG. 6 in its operative state;

FIG. 8 is a sectional elevation of a modification of the device illustrated in FIG. 6; and FIG. 9 is a partial sectional view of an automobile fitted with devices according to the invention.

In FIG. 1 and FIG. 2, A denotes the body of an occupant sitting in the seat 1 of an automobile and 2 denotes a polyethylene container fastened such as onto the interior of the roof 4 of the vehicle and used for housing inflatable tubular bags 3. The said container may otherwise be fastened onto the top of the seat 1. Preferably, the tubular bags 3 are made of rubberized nylon fabric or some other cloth, film, or rubber sheet, or a combination thereof in a foldable condition. As illustrated in FIG. 2 at least two such tubular bags are used to extend on each side of the occupant. Between the two tubular bags 3, there is fastened a net or cloth 6 for confining the occupant's body. The net or cloth 6 is normally folded and stowed in a chamber 20 of large width which is integral with the said containers 2. It is spread out to the state illustrated in FIG. 2 as the tubular bags 3 are inflated.

In FIG. 1 the tubular bags 3 are shown in broken lines in their fully inflated condition. The outer broken lines indicate the position of the bags immediately after inflation and the inner broken lines shown the situation after the bags and the net or cloth have been drawn around the occupant's body. The net 6 may be formed by knitting tenaceous cords made of natural or synthetic fibre or solid synthetic resin filament, e.g., nylon. It may otherwise be formed by weaving such cords in a relatively coarse mesh size. The cloths which can be used in place of the net 6 include cloths which provide a cushioning effect due to their inherent elasticity and also bag-shaped cloths of high shock-absorbing capacity which may already be filled with air or a suitable gas or which are inflated with gas at the time of operating the device. Inside each tubular bag 3, there is provided a gas-generating means 7 using an explosive or some other substance as the gas source. An electric circuit is formed to connect the gas-generating means to a sensor 9 (shown in FIG. 9) which is designed to detect an impact as by collision, so that the said gas source will be electrically ignited to generate the gas. To the forward end of each of the said unfoldable tubular bags 3, there is attached a relatively light, flexible, and sufficiently strong cord member 5, such as a hollow or solid string, rope or stranded cable made of natural fibre, synthetic fibre, solid synthetic resin filaments or light metal or a chain made of synthetic resin or light metal. Alternatively the cord member may be replaced by a strap. The said cord member 5 is passed around a pulley 8 and connected to the end of a tubular bag 11 which serves to draw in and tighten the cord member 5. Preferably the said tubular bag 11 serving to draw in the cord member is formed, similarly to the tubular bag 3, from a rubberized nylon fabric, some other fabric or rubber sheet or a combination thereof. This tubular bag 11 is disposed expandably within a long cylindrical container 10 which is provided inside the back of seat 1, under the floor of the vehicle or in the rear boot. This bag 11 is expanded to the condition illustrated by the broken lines in FIG. 1 as it is filled with the gas which is generated by the gas-generating means 12 provided inside the said bag 11. The gas sources which may be used for the said gas-generating means 12 include compressed gases, and substances capable of evolving gases upon chemical reaction besides explosives.

FIG. 3 illustrates a gas-generating means 7 which uses, as a gas source for example, compressed nitrogen gas. This gas-generating means is so constructed that the valve 19 of the gas cylinder 7 is opened by the electric signal forwarded from the sensor 9 (see FIG. 9) upon detection of an impact as by collision of the vehicle and the compressed gas is released from the cylinder and passed via the pipes 22 and 23 into the tubular bag 3 for unfolding the net or cloth and to the tubular bag 11 for drawing in the cord member 5. If a time lag is required between the inflation of the tubular bag 3 and that of the tubular bag 11 for drawing the cord member, then the resistance offered in the path of gas flow and the time required for full expansion of the bag may be varied by suitably selecting the inside diameter, length, volume and/or resistance of the inlet nozzle of these bags.

Figure 4:
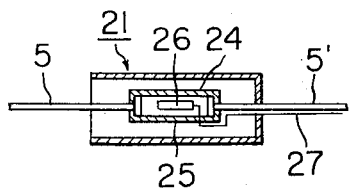
FIG. 4 is a longitudinal section of a detaching means, being part of the devices shown in FIGS. 1 to 3.

Denoted by 21 is a detecting means which is provided at one point in the length of the cord member 5. The detaching means facilitates the release of the occupant's body from the seat immediately after the accident. In other words, the detaching means is a means for severing the cord member. One example of this detaching means is now explained with reference to FIG. 4. Numerals 5 and 5' denote the two parts of the cord member and 24 denotes a cutting tube which incorporates a notch 25 for severing the cord member. The notch 25 is strong enough to withstand the load likely to be applied thereto so long as the pack of severing explosive 26 remains intact. Numeral 27 denotes an electric conductor leading to the pack of severing explosive 26. This detaching means is so designed as to effect the severance of cord member at a fixed interval of time (such as about one second) after the moment of accident by means of an electric signal from the aforesaid sensor 9 serving to detect the impact as by collision of the vehicle. The outer cylinder of this detaching means 21 serves to prevent broken pieces of the detaching means from flying out and harming the occupant at the time of severance of the cord.

Denoted by 13 is a check device for the cord member. When the net or cloth 6 connected to the cord members 5 and 5' is drawn in and tightened and the occupant's body impinges upon the stretched net or cloth 6, the net or cloth 6 tends to move backward and is loosened. If this occurs, the safety device fails to give desired confinement of the occupant's body for the personal protection aimed at. The check device 13 checks the backward movement of the cord member 5. Use of the check device 13, therefore, precludes loosening of the net or cloth 6 which would otherwise be possible. The check device 13 may have any of the constructions shown in FIGS. 5a, 5b and 5c. In the construction of FIG. 5a, 32 denotes a quadrant-shaped stop plate having saw teeth 36 formed on its arc portion. The plate 32 is pivotably mounted on a stationary member 31 by means of a bolt 34 which passes through a hole 33 in plate 32 and a slot 35 in the member 31. This stop plate 32 pivots eccentrically about the bolt 34. The slot 35 permits the position of the bolt 34 to be suitably selected in relation to the thickness of the cord member 5. The stop plate 32 is pivoted to the "opened" position to permit continued passage of the cord member 5 when drawn in the direction of the arrow A. If the cord member 5 is drawn in the direction of the arrow B, the stop plate is rotated to its "closed" position. Then, the stop plate 32 and the stationary member 31 between them pinch the cord member 5 and, at the same time, the teeth 36 bite into the cord member 5. Thus, the cord member 5 is checked at this position and is prevented from being drawn further in the direction of arrow B. In this manner, the check device 13 serves to check loosening of the net or cloth 6.

In the construction shown in FIG. 5b, 38 and 38' denote quadrant-shaped stop plates having teeth 42 and 42' of saw teeth formed on arc-shaped portions thereof. The plates 38, 38' are symmetrically positioned for pivotal movement on a stationary member 39 on either side of the cord member 5 by means of bolts 40, 40' which pass through holes 41, 41' in the stop plates. Bolt 41' passes through a hole in the stationary member 39 and bolt 40 passes through a slot 43 in the member 39. As shown the stop plates 38 and 38' are pivotable essentially on the stationary member. The slot 43 permits the position of the bolt 40 to be suitably selected in relation to the thickness of the cord member 5. The stop plates 38 and 38' are pivoted to their "opened" position to permit continued passage of the cord member 5 when it is drawn in the direction of the arrow A. When the cord member is drawn in the direction of the arrow B, the stop plates 38 and 38' are pivoted to their "closed" position. Then the stop plates 38 and 38' pinch the cord member 5 and, at the same time, the teeth 42 and 42' bite into the cord member 5. Thus, the cord member 5 is stopped at this position and is prevented from being drawn further in the direction of arrow B. Consequently, the check device 13 serves to check loosening of the net or cloth 6.

In the check device 13 having the construction of FIG. 5c, 44 and 44' denote circular stop plates mounted on a stationary plate 45 at symmetrical positions with reference to the centre line of the cord member 5. They are mounted for pivotal movement in both directions on the stationary member 45 by means of bolts 46 and 46' and holes 47 and 47' in the member 45. The fixing holes 47 and 47' are eccentric with reference to the centres of the stop plates 44 and 44'. Numeral 48 denotes a slot formed on the stationary member 45 so as to permit the position of the fixing hole 47 to be suitably selected in relation to the thickness of the cord member 5. The stop plates 44 and 44' are pivoted to their "opened" position to permit continued passage of the cord member 5 when it is drawn in the direction of the arrow A. When the cord member is drawn in the direction of the arrow B, the stop plates 44 and 44' pivot to their "closed" position because the fixing holes 47 and 47' are positioned eccentrically. Consequently, the stop plates pinch the cord member 5. The cord member 5 is stopped at this position and is prevented from being drawn further in the direction of arrow B. As a result, the check device 13 serves to check loosening of the net or cloth 6.

The operation of the embodiment illustrated in FIG. 1 and FIG. 2 will now be described. When the automobile is involved in a collision in the front, in the rear end, or in the side or when the vehicle tumbles and lands on its side, an electric circuit is established between the sensor 9 (illustrated in FIG. 9) and the gas-generating means 7 and 12. The gas-generating means 7 is actuated electrically and the tubular bag 3 is instantaneously expanded to the condition indicated by the broken lines in FIG. 1 by the pressure of the gas from the gas-generating means, with the result that the net or cloth 6 is expanded in front of the occupant's body as shown in FIG. 2. At the same time or with a moment's delay, the tubular bag 11 for drawing in the cord is inflated instantaneously within the container 10 by the gas-generating means 12, with the result that the cord member 5 is stretched tightly. Thus, the net or cloth 6 is pulled tightly downward. By this time, the occupant's body is thrown forward and pushes the net or cloth 6 forward, tending to pull the cord member 5 in the direction of the arrow B in FIG. 1. At that moment, the stopper 13 functions to check the backward movement of the cord member 5, permitting the net or cloth 6 to confine the occupant's body perfectly. After effects of the impact have subsided, the occupant severs the cord member by the detaching means and relieves himself of the protecting net or cloth. Alternatively the detaching means severs the cord member automatically after a suitable interval on receiving an electrical signal from the sensor 9, the signal causing detonation of the explosive charge 26.

The embodiment illustrated in FIG. 3 operates in the same way as that in FIG. 1, except the gas generated by the gas-generating means 7 is passed via tubes 22 and 23 laid such as on the rear side of the seat to inflate the tubular bag 3 and the tubular bag 11 for drawing in the cord member.

FIG. 6 and FIG. 7 illustrate another embodiment of the personal safety device of this invention. The operating principle of this embodiment is the same as that of FIG. 1 and FIG. 2. The device is identical in structure, function and effect with the device of FIG. 1 and FIG. 2, except that projectiles 16A and 16B each of the shape of a hemisphere, an ellipse, a cone, a spindle or a bullet, adapted to be projected by the pressure of the generated gas, are used in the place of the tubular bag 3 and the tubular bag 11. Referring to FIG. 6 and FIG. 7, A denotes the occupant's body placed in the seat 1 of a vehicle such as an automobile, 2 denotes containers fixed above the seat 1 such as on the interior of the roof 4 of the automobile or at the top of the back of seat 1 for housing cord member 5. As illustrated in FIG. 7, the containers 2 are provided at the sides of the vehicle. Each member 5 is held loosely at its normal condition, with one end attached to the farthest recess of the container 2. At one point in its length, the cord is tied to the projectile 16A which is mounted on a projection tube 14A. Then, the cord member passes a detaching means 21, a pulley 8, and a check device 13, with the other end attached to a projectile 16B which is mounted on a projection tube 14B. The net or cloth 6, in the normal condition, is folded and stowed in a chamber 20 of a large width which is interposed between the containers 2 for the cord member 5 to form an integral unit with the containers 2. Each end of this net or cloth 6 is joined to the part of the cord member 5 which is interposed between the interior of the container 2 and the projectile 16A. Denoted by 17A and 17B are gas-generating means using an explosive as the gas source. As the projection tube, there may be used a hollow cylinder having a bottom on one end and made of metal, wood or plastic substance. The projectile, in the normal condition, is inserted into or capped on the projection tube. In case of an accident, it is projected by the pressure of the gas. For advantageous projection, this projectile is formed in the aforementioned shape. Preferably it is made of a relatively light material such as synthetic resin, metal or wood.

The operation of this device is described. When the vehicle is involved in a traffic accident, the sensor 9 shown in FIG. 9 detects an impact and completes an electric circuit through the electric conductor to the gas-generating means 17A and 17B. The electric signal ignites the gas-generating agent in the said gas-generating means to generate the gas. By the pressure of the generated gas, the projectiles 16A and 16B are instantaneously projected forwardly and downwardly. By virtue of the motion of the projectile 16A, the cord member 5 takes up the position indicated by the broken lines of FIG. 6, with the result that the net or cloth 6 is spread out over the front of the occupant's body as shown in FIG. 7. By virtue of the motion of the projectile 16B projected from the tube 17B, the cord member 5 is stretched tight, with the result that the net or cloth 6 is pulled downwardly and rearwardly. When the occupant's body impinges upon the net or cloth 6, the check device 13 functions to check the loosening of the cord member. Consequently, the net or cloth 6 provides perfect confinement of the occupant's body without being loosened.

FIG. 8 is a longitudinal section of a still further embodiment which uses a high-pressure nitrogen as the gas source in the gas-generating means as in the embodiment of FIG. 3. When the valve 19 is opened by the signal from the sensor 9, the high-pressure gas inside the cylinder 28 is passed via tubes 22 and 23 into the projection tubes 14A and 14B. After this point, the projectiles 16A and 16B, the cord member 5 and the net or cloth 6 behaves in the same way as in the embodiment of FIG. 6.

The tubular bag 11 used in the devices illustrated in FIG. 1 and FIG. 3 for the purpose of pulling the cord member may be substituted by the cord tightening means provided with the projectile 16B which is used in the device illustrated in FIG. 6. The cord tightening means provided with the projectile 16B which is used in the device illustrated in FIG. 6 and FIG. 8 may likewise be substituted with the tubular bag 11 for drawing the cord member which is used in the device illustrated in FIG. 1 and FIG. 3.

It is added that, as the means for drawing and tightening the cord member in the personal safety device of this invention, there may be used a spring, an air turbine, a hydraulic cylinder or a motor besides those mentioned above.

We claim:

1. A personal safety device for protecting an occupant of a vehicle in the event of an accident, said device comprising:
   a. a confining means adapted in use for confining an occupant in close proximity to a seat, said confining means being normally in a gathered or folded condition adjacent to said seat,
   b. inflatable projectiles for projecting the confining means,
   c. gas generating means provided inside said inflatable projectiles,
   d. tightening means for drawing and tightening said confining means around the occupant's body, said tightening means having a quadrant-shaped or circular stop plate,
   e. a strap for drawing said confining means when projected around the occupant's body, one end of which is connected to said confining means and the other end of which is connected to said tightening means around said occupant's body,
   f. detaching means facilitating removal of the confining means from around the occupant's body after the accident, and
   g. a sensing means adapted to actuate said gas generating means on detecting an acceleration exceeding a predetermined magnitude, wherein said tightening means including a further gas generating means effective for drawing said strap around the occupant's body.

2. The device of claim 1 wherein said detaching means is actuable by an explosive charge which is arranged to be detonated electrically.

* * * * *